(12) United States Patent
Knebel

(10) Patent No.: US 6,867,899 B2
(45) Date of Patent: Mar. 15, 2005

(54) MICROSCOPE, FLOW CYTOMETER, AND METHOD FOR EXAMINATION OF A SPECIMEN

(75) Inventor: Werner Knebel, Kronau (DE)

(73) Assignee: Leica Microsystems Heidelberg GmbH, Mannheim (DE)

(*) Notice: Subject to any disclaimer, the term of this patent is extended or adjusted under 35 U.S.C. 154(b) by 113 days.

(21) Appl. No.: 10/316,544

(22) Filed: Dec. 11, 2002

(65) Prior Publication Data

US 2003/0123144 A1 Jul. 3, 2003

(30) Foreign Application Priority Data

Dec. 20, 2001 (DE) ............................................. 101 62 789

(51) Int. Cl.⁷ ............................................... G02F 1/33
(52) U.S. Cl. ..................................... 359/305; 359/309
(58) Field of Search ............................ 359/305, 308, 359/309, 285; 372/21, 32; 356/303, 307; 250/461.2

(56) References Cited

U.S. PATENT DOCUMENTS

| | | | |
|---|---|---|---|
| 5,329,352 A | 7/1994 | Jacobsen | ..................... 356/301 |
| 5,528,368 A | * 6/1996 | Lewis et al. | ................. 356/456 |
| 6,134,002 A | 10/2000 | Stimson et al. | ............. 356/326 |

FOREIGN PATENT DOCUMENTS

| | | |
|---|---|---|
| DE | 4111903 | 10/1992 |
| DE | 19906757 | 12/1999 |
| DE | 19944355 | 3/2001 |

OTHER PUBLICATIONS

Terskikh et al. "Fluorescent Timer: Protein that changes color with time." Science vol. 290; Nov. 24, 2000; pp. 1585–1588.

* cited by examiner

Primary Examiner—Scott J. Sugarman
Assistant Examiner—Richard Hanig
(74) Attorney, Agent, or Firm—Davidson, Davidson & Kappel, LLC

(57) ABSTRACT

A microscope with a light source that emits light for illumination of a specimen and with a spectrometer that receives detection light proceeding from the specimen, has an optical arrangement which has an acoustooptical component, and which directs the light of the light source to the specimen and delivers the detection light proceeding from the specimen to a spectrometer in spectrally undivided fashion. A flow cytometer and a method for examination of a specimen are also disclosed.

25 Claims, 5 Drawing Sheets

MICROSCOPE, FLOW CYTOMETER, AND METHOD FOR EXAMINATION OF A SPECIMEN

CROSS REFERENCE TO RELATED APPLICATIONS

This application claims priority of the German patent application 101 62 789.0 which is incorporated by reference herein.

FIELD OF THE INVENTION

The invention concerns a microscope and a flow cytometer.

The invention moreover concerns a method for examination of a specimen.

BACKGROUND OF THE INVENTION

In scanning microscopy, a specimen is illuminated with a light beam in order to observe the reflected or fluorescent light emitted by the specimen. The focus of an illuminating light beam is moved in a specimen plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the light coming from the specimen is measured as a function of the position of the scanning beam. The positioning elements are usually equipped with sensors to ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an aperture (called the "excitation pinhole"), a beam splitter, a beam deflection device for beam control, a microscope optical system, a detection pinhole, and the detectors for detecting the detection or fluorescent light. The illuminating light is coupled in via a beam splitter. The fluorescent or reflected light coming from the specimen travels back through the beam deflection device to the beam splitter, passes through it, and is then focused onto the detection pinhole behind which the detectors are located. Detection light that does not derive directly from the focus region takes a different light path and does not pass through the detection pinhole, so that a point datum is obtained which results, by sequential scanning of the specimen, in a three-dimensional image. A three-dimensional image is usually achieved by acquiring image data in layers, the track of the scanning light beam on or in the specimen ideally describing a meander (scanning one line in the X direction at a constant Y position, then stopping the X scan and slewing by Y displacement to the next line to be scanned, then scanning that line in the negative X direction at constant Y position, etc.). To allow the acquisition of image data layer by layer, the specimen stage or the objective is displaced after a layer is scanned, and the next layer to be scanned is thus brought into the focal plane of the objective.

German Unexamined Application DE 41 11 903 A1 discloses a method for generating and correlating light-microscope images with wavelength-resolved measured data of specimens by means of single or double scanning, using a confocal scanning light microscope, of individual elements of the specimen surface to be imaged. The method comprises coupling a portion of the light out of the imaging beam path into a spectrometer, and correlating the image information with the spectroscopic data by storing the spectroscopic data in a two-dimensional region, one dimension being used for storing the measured spectrum of the individual elements, and the second dimension being activated by means of the light intensity re-emitted from the scanned elements, or by means of a criterion obtained by image processing from the overall information of the specimen image. The advantage of this method consists in the complete utilization of the capabilities of a confocal scanning light microscope and the various spectroscopic methods.

U.S. Pat. No. 6,134,002 discloses a confocal scanning microscope and a method for rapid generation of spectrally resolved images, at least two points of the specimen being scanned simultaneously.

The apparatuses and methods disclosed in the aforesaid documents have the disadvantage that the spectrum acquired in each case, which is generated from the light proceeding from the specimen, is incomplete in a very broad region of several tens of nanometers around the wavelength of the illuminating light. This is attributable to the fact that dichroic or triple-dichroic beam splitters are used on the one hand to deflect the light of a light source to the specimen and on the other hand to direct the detection light proceeding from the specimen into a detection beam path; in this context, the undesired illuminating light still present in the detection light due to scattering and reflection must be blocked out, and with dichroic or triple dichroic beam splitters that are embodied as bandpass or cutoff filters this is possible only at the cost of the information loss in the spectrum described above, since the spectral edges of the beam splitters cannot be manufactured with infinite steepness but rather have slopes that usually extend over several nanometers. Because the power level of the fluorescent light is much lower than that of the reflected excitation light, the use of semitransparent neutral splitters to separate the illuminating and detection light also does not solve the aforesaid problem, but merely causes distortion of the spectrum.

The known scanning microscopes and methods prove to be very particularly disadvantageous in applications which involve the analysis of specimens that are labeled with several dyes simultaneously, since in these experiments the illuminating light has two, three, or more wavelengths, so that the aforementioned problems are evident to an even more extreme and troublesome extent.

German Unexamined Application DE 199 06 757 discloses an optical arrangement in the beam path of a light source suitable for fluorescence excitation, preferably in the beam path of a confocal laser scanning microscope, having at least one spectrally selective element for coupling the excitation light of at least one light source into the microscope and for blocking the excitation light or excitation wavelength that is scattered and reflected at the specimen out of the light coming from the specimen via the detection beam path. For variable configuration with a very simple design, the optical arrangement is characterized in that excitation light having differing wavelengths can be blocked out by means of the spectrally selective element. Alternatively, an optical arrangement of this kind is characterized in that the spectrally selective element can be set to the excitation wavelength that is to be blocked out. The spectrally selective element can be embodied as an acoustooptical deflector (AOD) or an acoustooptical tunable filter (AOTF). In a preferred embodiment, a scanning microscope that utilizes and detects the dispersive properties of the spectrally selective element is disclosed.

This scanning microscope has the disadvantage of a very low spectral resolution, since the dispersion properties of usual acoustooptical elements, such as acoustooptical deflectors (AOD) or acoustooptical tunable filters (AOTF) are neither linear nor adequate to achieve sufficient spreading with a reasonable physical size.

The same problems occur analogously with flow cytometers, in which the specimen consists of a fluid shaped into a stream by way of a nozzle.

SUMMARY OF THE INVENTION

It is therefore the object of the invention to propose a microscope that makes possible improved, largely uninterrupted and defect-free, high-resolution spectral analysis of the detection light proceeding from a microscopic specimen.

The aforesaid object is achieved by way of a microscope comprising a light source that emits light for illumination of a specimen, a spectrometer that receives detection light proceeding from the specimen, and an optical arrangement which has an acoustooptical component, and which directs the light of the light source to the specimen and delivers the detection light proceeding from the specimen to the spectrometer in spectrally undivided fashion.

A further object of the invention is to describe a flow cytometer that makes possible improved, largely uninterrupted and defect-free, high-resolution spectral analysis of the detection light.

This object is achieved by way of a flow cytometer comprising a light source that emits light for illumination of a specimen, a spectrometer that receives detection light proceeding from the specimen, and an optical arrangement which has an acoustooptical component, and which directs the light of the light source to the specimen and delivers the detection light proceeding from the specimen to the spectrometer.

A further object of the invention is to disclose a method for examination of a specimen that makes possible improved, largely uninterrupted and defect-free, high-resolution acquisition of a wavelength spectrum of the detection light proceeding from a specimen.

This object is achieved by way of a method comprising the steps of:

directing the light of a light source onto the specimen with an optical arrangement that contains an acoustooptical component;

delivering the detection light proceeding from the specimen to a spectrometer with the optical arrangement; and acquiring a wavelength spectrum.

The invention has the advantage of making possible high-resolution, largely continuous, and rapid spectral analysis of the detection light proceeding from a specimen. The invention is very particularly advantageous in the context of polychromatic specimen illumination and for experiments involving a rapid change in the illumination wavelength. The invention makes possible rapid and almost undistorted acquisition of the emission spectrum of a specimen.

In a preferred embodiment, the optical arrangement contains a compensation element that compensates for a spectral division, produced by the acoustooptical component, of the light proceeding from the specimen. In many acoustooptical components, the spectral division is brought about by the arrangement of the boundary surfaces, resulting in a prismatic effect on the detection light beam. An embodiment in which the optical compensation element compensates both for an unintentional prismatic effect and for birefringence is very particularly advantageous. In this context, the optical compensation element preferably contains a further acoustooptical component. In a very particularly advantageous variant embodiment, the further acoustooptical component has the same external form and the same crystal structure as the first acoustooptical component.

The further acoustooptical component and the first acoustooptical component are oriented with a rotation of 180 degrees from one another with respect to the propagation direction of the detection light beam striking the first acoustooptical component. As a rule, the further acoustooptical component oriented in this fashion is offset laterally from the axis defined by the propagation direction of the detection light beam striking the first acoustooptical component, so that the detection light beam strikes the further acoustooptical component. In this embodiment, the spacing of the first acoustooptical component from the further acoustooptical component is selected to be as small as possible, to prevent excessive spatial division of the detection light beam between the acoustooptical component and the further acoustooptical component. Spatial divisions on the order of half a beam diameter are acceptable.

An embodiment in which the acoustooptical component is an acoustooptical tunable filter (AOTF) or an acoustooptical deflector (AOD) or an acoustooptical beam splitter (AOBS) is very particularly advantageous.

By way of the acoustooptical component, light of the light source can be at least partially blocked out of the detection light using the optical arrangement. This embodiment is advantageous especially in the context of polychromatic illumination of specimens having different fluorescent dyes. The suppression of the excitation wavelengths by means of the acoustooptical component is so good that even when several excitation wavelengths are used simultaneously, they do not occur in troublesome fashion in the spectrum. Additional blocking filters are not necessary.

Since there is no "cutoff filter characteristic," it is even possible to detect fluorescences that occur below the excitation wavelength (anti-Stokes fluorescence).

In a preferred embodiment, the acoustooptical component cuts a band only approx. 2 nm wide (depending on the excitation wavelength) out of the emission spectrum. This small gap is generally not troublesome to the observer. With smaller spectrometers, the width of this gap is already close to the resolution limit. For later reproduction by computer, the gaps can easily be closed up on a software basis by interpolation.

In a very particularly preferred embodiment, even the small gaps described above can be completely avoided by scanning the specimen twice with excitation wavelengths shifted by an amount equivalent to the cut-out bands, and combining the measured emission spectra. It is particularly advantageous in this context that the acoustooptical component can switch over very quickly.

In a preferred embodiment, the portion having at least one selectable wavelength can be blocked out of the light for illumination using the optical arrangement. In the case of a microscope, and in very particularly advantageous fashion in the case of a scanning microscope, the wavelength of the blocked-out light can also be accomplished during scanning.

In a preferred embodiment, a beam deflection device that guides the light for illumination line-by-line over the specimen is provided. A variant in which the wavelength of the light for illumination can be switched over line-by-line is very particularly advantageous. Changing illumination of the specimen, in particular during scanning, is made possible for the first time by the invention in the context of a scanning microscope with different excitation wavelengths, since in known arrangements, changing the wavelength of the illuminating light requires manual changing of the beam splitters; this is much too slow for useful scanning, especially with living specimens.

In a preferred embodiment, the microscope is embodied as a scanning microscope or as a confocal scanning microscope.

A particular variant of the invention contains a light-guiding fiber that receives detection light from the optical arrangement and directs it to the spectrometer.

In a preferred embodiment of the method, the detection light is conveyed to the spectrometer in spectrally undivided fashion. In another embodiment, the method contains the further step of compensating for a spectral division, generated by the acoustooptical component, of the light proceeding from the specimen. In a further embodiment, the method contains the further step of blocking the light of the light source out of the detection light using the optical arrangement.

The detection light proceeding from the specimen can, in particular, be fluorescent light.

In a preferred embodiment, the light of the light source has several wavelengths, the method containing the further step of blocking a portion having at least one selectable wavelength out of the light for illumination using the optical arrangement.

In an embodiment, the method comprises the further step of attenuating a portion having at least one selectable wavelength of the light for illumination using the optical arrangement.

The method can be carried out in particular with a microscope, a scanning microscope, or a flow cytometer. The specimen can be, in particular, biological specimens or biochips.

The fluorescence resonance energy transfer (FRET) efficiency of specifically labeled specimens can be measured using the method according to the present invention. With the method according to the present invention, the FRET shift (which differs depending on the environment of the structures being examined) can be measured easily and efficiently, permitting conclusions as to the composition and behavior of the specimen under examination.

In a preferred embodiment the specimen is marked with a fluorescent protein, whereby the detection light proceeding from the specimen changes the wavelength with time. The time dependent spectral behavior of the marked specimen can be effectively observed by using the described method. Fluorescent proteins of this kind are for example known from Alexey Terskikh et al. "Fluorescent Timer: Protein That Changes Color with Time"; Science Vol. 290, p. 1585–1588, Nov. 24, 2000.

BRIEF DESCRIPTION OF THE DRAWINGS

The subject matter of the invention is depicted schematically in the drawings and will be described below with reference to the Figures, in which identically functioning elements are labeled with the same reference characters. In the drawings.

DETAILED DESCRIPTION OF THE INVENTION

Figure 1:
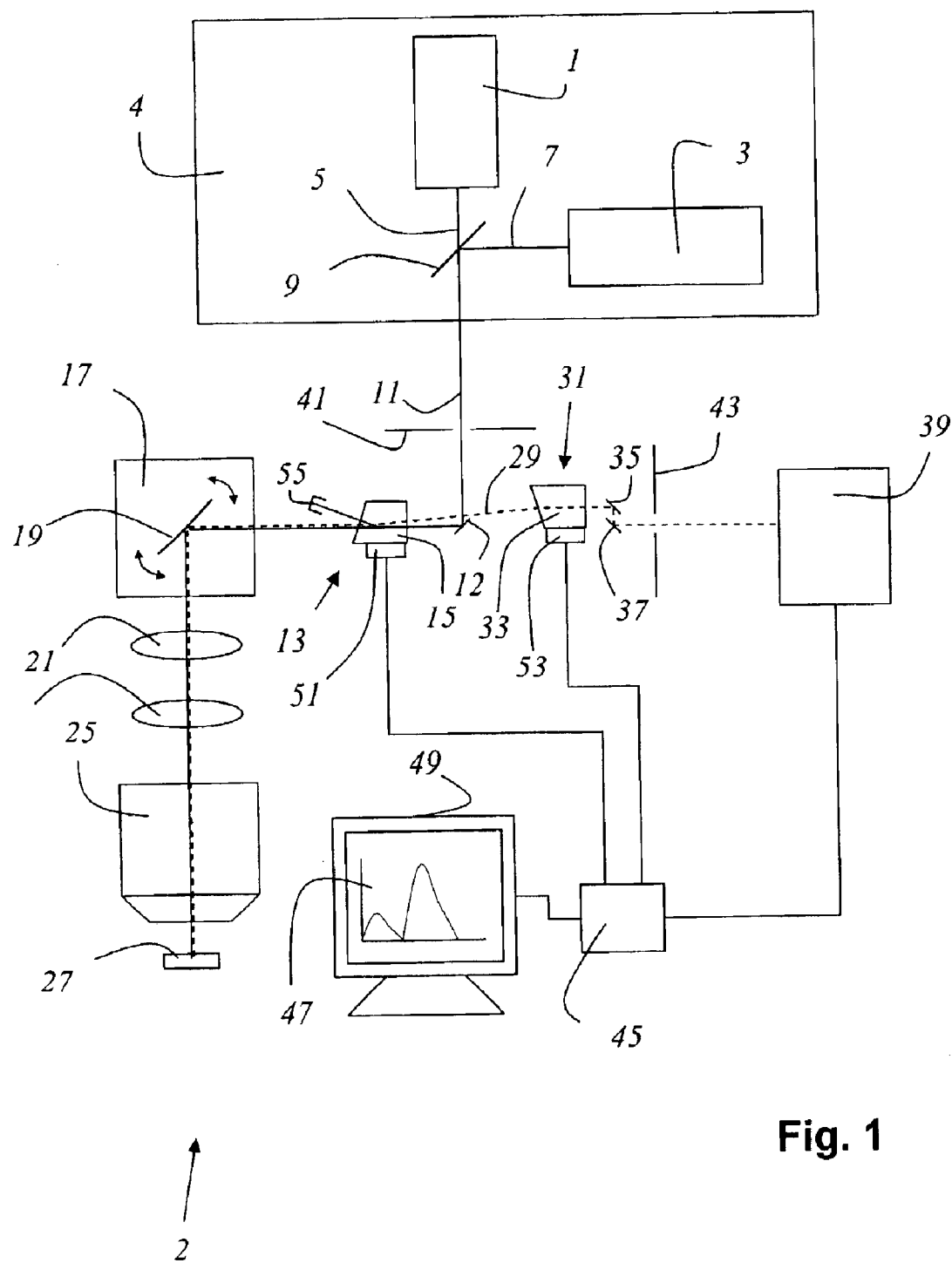
FIG. 1 shows a microscope according to the present invention.

FIG. 1 shows a microscope 2 according to the present invention that is embodied as a confocal scanning microscope, having a light source 4 that contains two lasers 1, 3 whose emitted light beams 5, 7 have different wavelengths, emitted light beams 5, 7 being combined with a dichroic beam combiner 9 into an illuminating light beam 11. The scanning microscope comprises an acoustooptical component 13 that is embodied as an AOTF 15. Illuminating light beam 11 is reflected by a deflecting mirror 12 to acoustooptical component 13. From acoustooptical component 13, illuminating light beam 11 arrives at a beam deflection device 17 that contains a gimbal-mounted scanning mirror 19 and that guides illuminating light beam 11, through scanning optical system 21, tube optical system 23, and objective 25, over or through specimen 27. Detection light beam 29 coming from the specimen travels in the opposite direction through scanning optical system 21, tube optical system 23, and objective 25, and arrives via scanning mirror 19 at acoustooptical component 13, which conveys detection light beam 29 to a compensation element 31 that is embodied as a further acoustooptical component 33. After passing through compensation element 31, detection light beam 29 strikes a mirror pair made up of a first mirror 35 and a second mirror 37. The mirror pair serves to bring detection light beam 29 onto the desired beam axis, i.e. the beam axis that detection light beam 29 defines upon emergence from beam deflection device 17. The mirror pair conveys detection light beam 29 to a spectrometer 39 which spectrally analyzes detection light beam 29 and delivers the spectrum, in the form of electrical signals, to a PC 45 which displays the spectrum in a graphic depiction 47 on a display 49. In the drawings, illuminating light beam 11 is depicted as a solid line, and detection light beam 29 as a dashed line. Illumination pinhole 41 and detection pinhole 43 that are usually provided in a confocal scanning microscope are schematically drawn in for the sake of completeness. Omitted in the interest of better clarity, however, are certain optical elements for guiding and shaping the light beams. These are sufficiently familiar to a person skilled in this art. Acoustooptical component 13, which serves to select the portions of the illuminating light beam having the selected wavelengths, is configured as AOTF 15, through which an acoustic wave passes. The acoustic wave is generated by an electrically activated piezoacoustic generator 51. Activation is accomplished via a PC 45. PC 45 also controls compensation element 31 via a further electrically activated piezoacoustic generator 53. The HF frequencies of piezoacoustic generator 51 are selected so that only the portions of illuminating light beam 11 having the desired wavelengths arrive at beam deflection device 17. The other portions of illuminating light beam that are not influenced by the acoustic excitation are directed into a beam trap 55. By varying the amplitude of the acoustic wave, the power level of the light of illuminating light beam 11 having the desired wavelengths can be selected. The crystal sectioning and orientation of acoustooptical component 13 are selected such that with an identical incoupling direction, different wavelengths are deflected in the same direction. Further acoustooptical component 33 is also embodied as an AOTF. The HF frequency of the further electromagnetic high-frequency wave is selected so that the portions of detection light beam 29 that exhibit the wavelength of illuminating light beam 11 are blocked out. PC 45 is provided for selection of the HF frequencies. PC 45 controls the high-frequency source for the activation of piezoacoustic generator 51, and the further high-frequency source for the activation of piezoacoustic generator 53, as defined by the user. The user makes settings using a computer mouse (not shown) and a keyboard (also not shown). Beam deflection device 17 is coupled to PC 45 in such a way that if the user so desires, the wavelength of illuminating light beam 11 can be switched over line-by-line.

Figure 2:
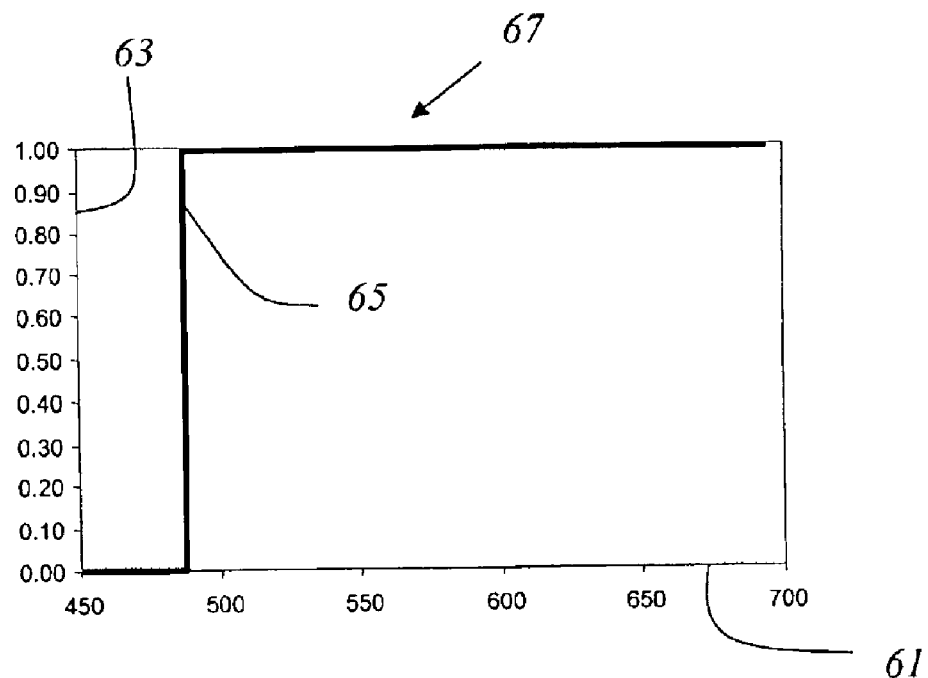
FIG. 2 shows the transmission spectrum of an ideal beam splitter for illuminating light having one wavelength.

FIG. 2 shows transmission spectrum 67 of an ideal beam splitter for reflecting illuminating light of one wavelength to the specimen and allowing the detection light proceeding from the specimen to pass to the spectrometer. The wavelength (in nanometers) is plotted on abscissa 61; the transmissivity of the beam splitter (in fractions of unity) is plotted on ordinate 63. Ideally, the beam splitter completely reflects the illuminating light at (in this example) 480 nm, and transmits the fluorescent light that has been Stokes-shifted to higher wavelengths and proceeds from the specimen as detection light. Ideally, the slope of edge 65 is infinite.

Figure 3:
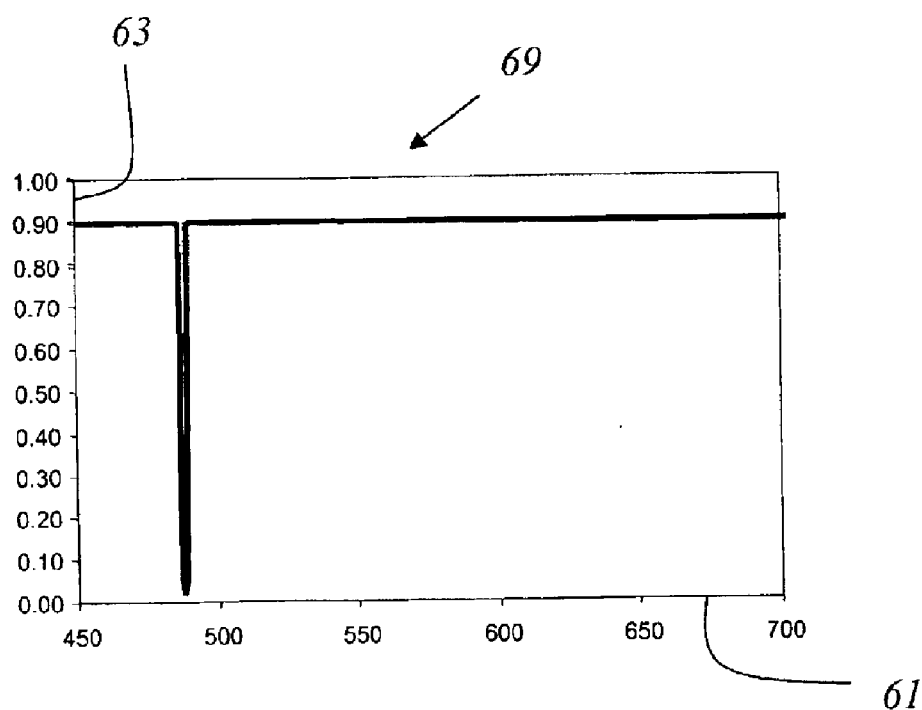
FIG. 3 shows the transmission spectrum of an acoustooptical component for illuminating light having one wavelength.

FIG. 3 shows, for comparison with FIG. 2, transmission spectrum 69 of an acoustooptical component (embodied as an AOTF or AOBS) for illuminating light of one wavelength. In terms of edge slope, the behavior of the acoustooptical component corresponds almost to that of an ideal beam splitter.

Figure 4:
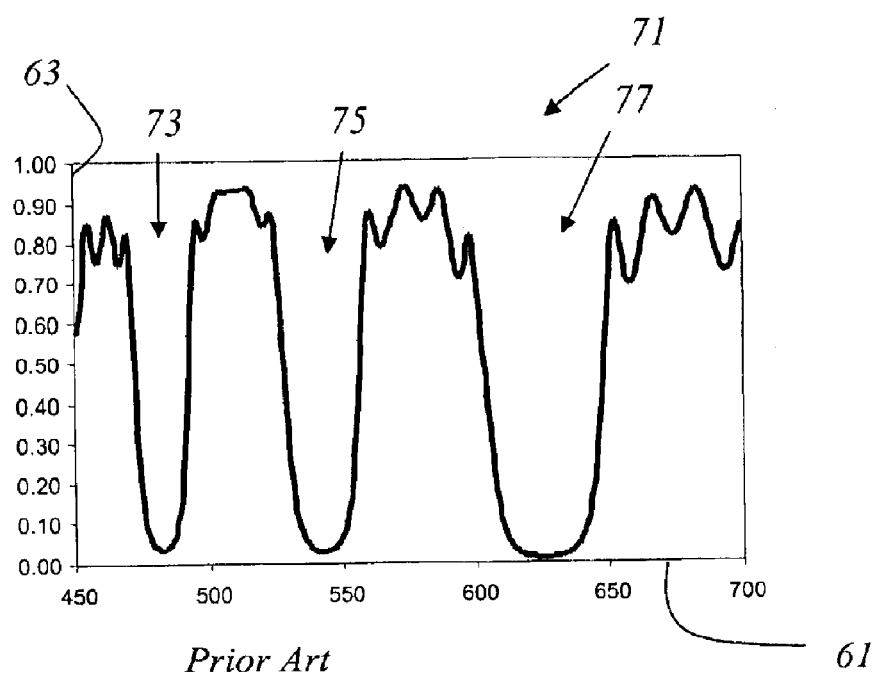
FIG. 4 shows the transmission spectrum of a real triple dichroic.

FIG. 4 shows transmission spectrum 71 of a real triple dichroic known from the existing art for illuminating light having three wavelengths, in this example 480 nm, 543 nm, and 625 nm. It is clearly evident that the transmissivity is limited not only for the aforesaid illumination wavelengths but also for broad wavelength bands 73, 75, 77. No detection light is transmitted in the region of these wavelength bands 73, 75, 77, so that the measured spectra of the detection light exhibit gaps in these regions. In addition, the transmission behavior outside wavelength bands 73, 75, 77 is irregular, which results in distortions in the measured wavelength spectrum of the detection light.

Figure 5:
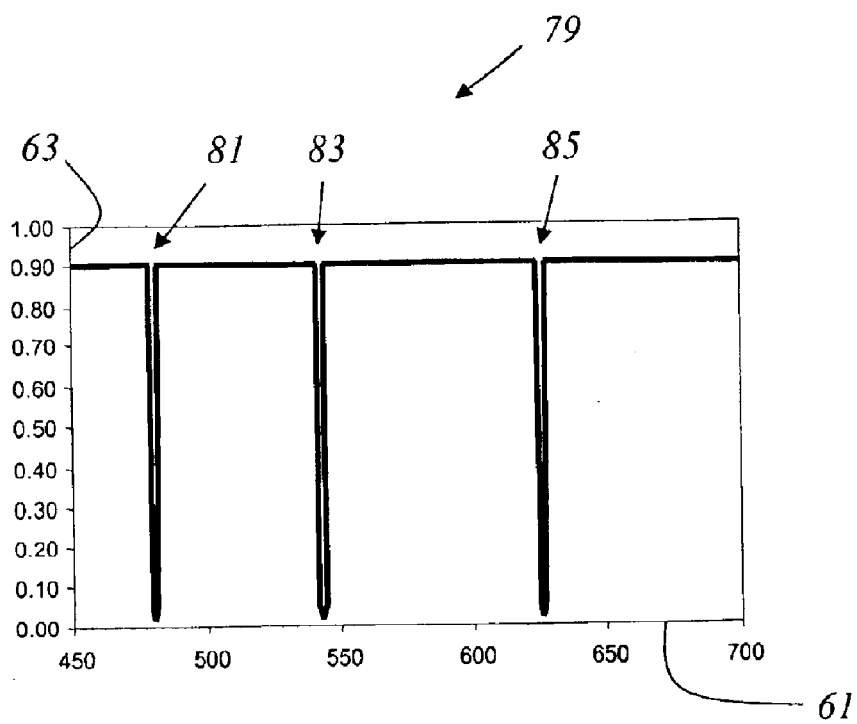
FIG. 5 shows the transmission spectrum of an acoustooptical component for illuminating light having three wavelengths.

FIG. 5 shows transmission spectrum 79 of an acoustooptical component for illuminating light having three wavelengths (in this example, 480 nm, 543 nm, and 625 nm) for comparison with transmission spectrum 71, known from the existing art, of a real triple dichroic. It is clearly evident that wavelength bands 81, 83, and 85 are substantially narrower than those of the triple dichroic. The transmissivity outside wavelength bands 81, 83, and 85 is moreover constant at approx. 90%. In terms of edge slope, the behavior of the acoustooptical component is greatly improved over that of a triple dichroic.

Figure 6:
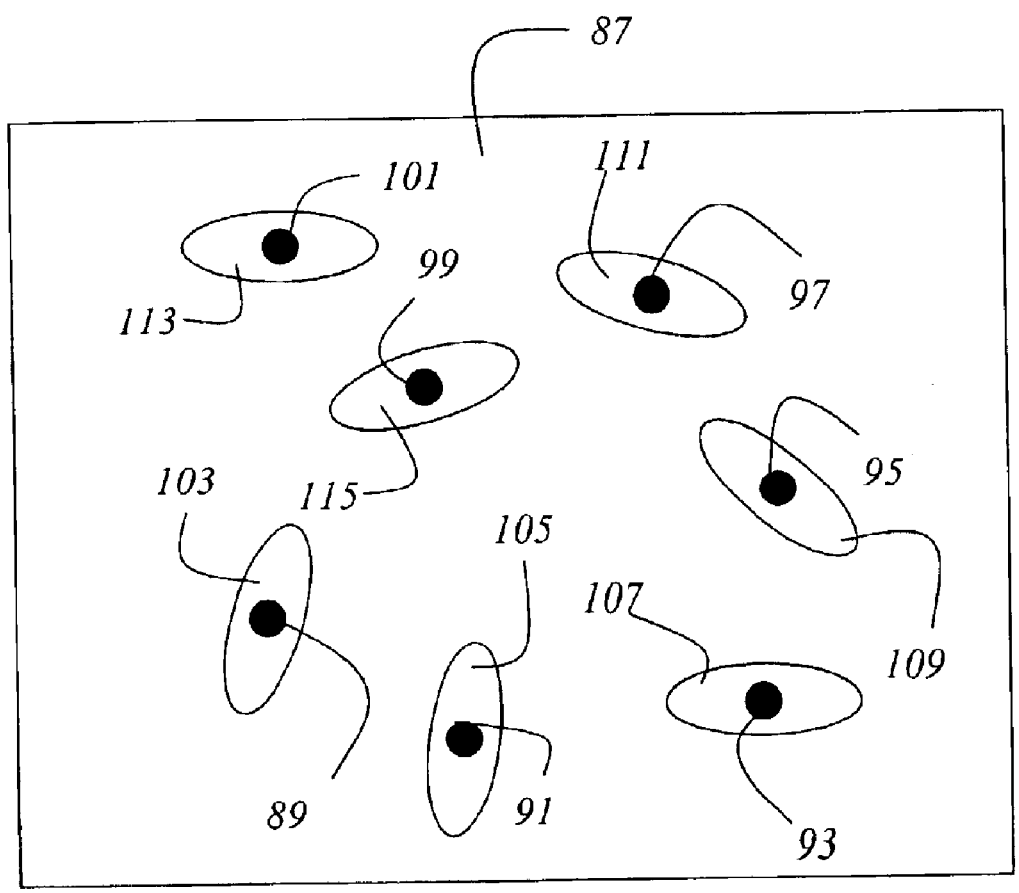
FIG. 6 shows an application of the method according to the present invention.

FIG. 6 shows an application of the method according to the present invention to specimens that are labeled for examinations based on fluorescence resonance energy transfer (FRET). Specimen 87 is illuminated at various points 89, 91, 93, 95, 97, 99, 101 of the specimen. The points were selected so that they are located on cells 103, 105, 107, 109, 111, 113, 115 present in the specimen. Firstly illumination with a wavelength of 430 nm is performed, then, after about 10 µs, illumination of the same points with illuminating light at the 514 nm wavelength, the same points 89, 91, 93, 95, 97, 99, 101 in the image being continuously illuminated in succession. From an observation of changes in the spectrum over time, conclusions can be drawn as to the structure and properties of the specimen.

Figure 7:
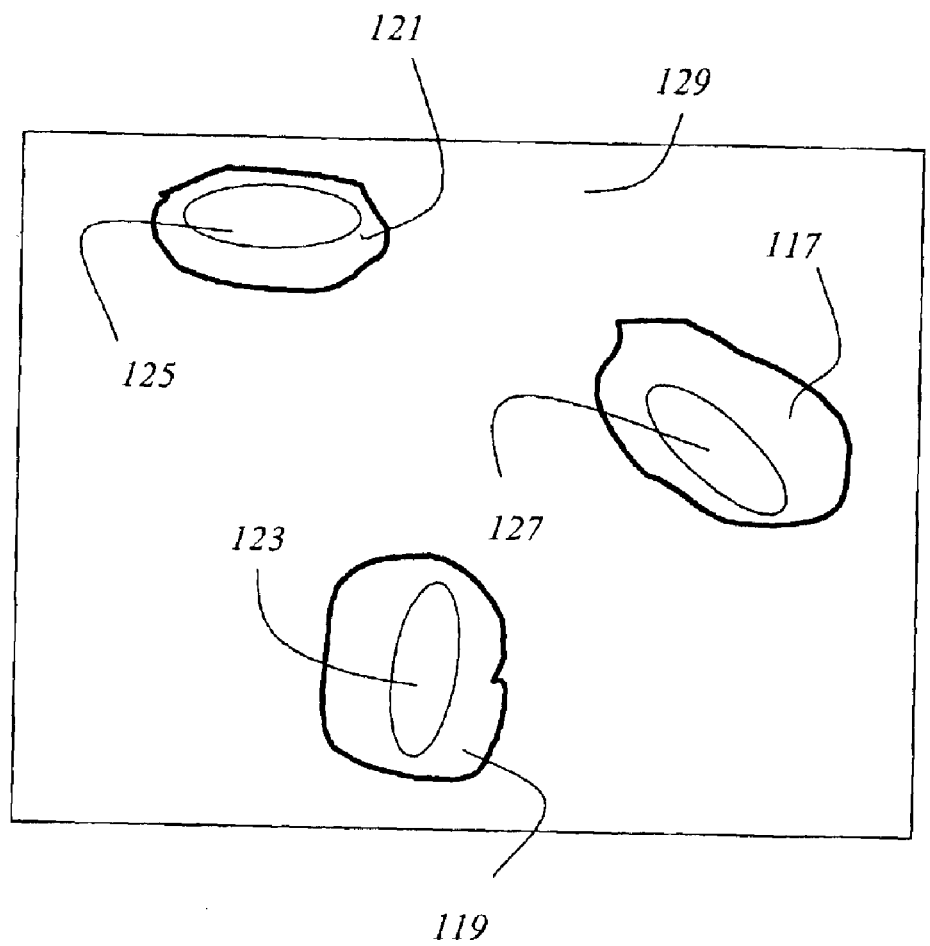
FIG. 7 shows a further application of the method according to the present invention.

FIG. 7 shows a further application of the method according to the present invention to specimens that are labeled for examinations based on fluorescence resonance energy transfer (FRET). With this method, regions 117, 119, 121, which contain cells 123, 125, 127 in specimen 129 being examined, are illuminated with illuminating light having a wavelength of 488 nm in order to acquire the donor spectrum. At the same time, the region outside regions 117, 119, 121 is illuminated with illuminating light having a wavelength of 543 nm in order to acquire the acceptor spectrum. Simultaneous acquisition of the donor spectrum, acceptor spectrum, and FRET spectrum makes it possible, by observing the FRET shift, to draw conclusions as to the structure and properties of the specimen.

The invention has been described with reference to a particular embodiment. It is self-evident, however, that changes and modifications can be made without thereby leaving the range of protection of the claims below.

What is claimed is:

1. A microscope comprising
   a light source that emits light for illumination of a specimen,
   a spectrometer that receives detection light proceeding from the specimen, and
   an optical arrangement which has an acoustooptical component, and which directs the light of the light source to the specimen and delivers the detection light proceeding from the specimen to the spectrometer in spectrally undivided fashion.

2. The microscope as defined in claim 1, wherein the optical arrangement contains a compensation element that compensates for a spectral division, produced by the acoustooptical component, of the light proceeding from the specimen.

3. The microscope as defined in claim 2, wherein the compensation element is a further acoustooptical component.

4. The microscope as defined in claim 3, wherein the acoustooptical component is an acoustooptical tunable filter (AOTF) or an acoustooptical deflector (AOD).

5. The microscope as defined in claim 1, wherein the light of the light source comprises several wavelengths and wherein a portion of at least one selectable wavelength can be blocked out of the light for illumination with the optical arrangement.

6. The microscope as defined in claim 1, light of the light source can be at least partially blocked out of the detection light with the optical arrangement.

7. The microscope as defined in claim 1, further comprising a light-guiding fiber that receives detection light from the optical arrangement it to the spectrometer.

8. The microscope as defined in claim 1, further comprising a beam deflection device that guides the light for illumination line-by-line over the specimen, whereby the wavelength of the light for illumination can be switched over line-by-line.

9. The microscope as defined in claim 1, wherein the microscope is a scanning microscope or a confocal scanning microscope.

10. A flow cytometer comprising
   a light source that emits light for illumination of a specimen,
   a spectrometer that receives detection light proceeding from the specimen, and
   an optical arrangement which has an acoustooptical component, and which directs the light of the light source to the specimen and delivers the detection light proceeding from the specimen to the spectrometer.

11. The flow cytometer as defined in claim 10, wherein the optical arrangement contains a compensation element that compensates for a spectral division, produced by the acoustooptical component, of the light proceeding from the specimen.

12. The flow cytometer as defined in claim 10, wherein light of the light source can be at least partially blocked out of the detection light with the optical arrangement.

13. The flow cytometer as defined in claim 10, wherein the light of the light source comprises several wavelengths and wherein a portion having at least one selectable wavelength can be blocked out of the light of the light source with the optical arrangement.

14. The flow cytometer as defined in claim 10, wherein the light of the light source comprises several wavelengths and wherein a portion having at least one selectable wavelength can be attenuated out of the light of the light source using the optical arrangement.

15. A method for examination of a specimen, comprising the steps of:
   directing the light of a light source onto the specimen with an optical arrangement that contains an acoustooptical component;
   delivering the detection light proceeding from the specimen to a spectrometer with the optical arrangement; and
   acquiring a wavelength spectrum.

16. The method as defined in claim 15, wherein the detection light is conveyed to the spectrometer in spectrally undivided fashion.

17. The method as defined in claim 15, further comprising the step of
   compensating for a spectral division, generated by the acoustooptical component, of the light proceeding from the specimen.

18. The method as defined in claim 15, characterized by the further step of
   blocking the light of the light source out of the detection light with the optical arrangement.

19. The method as defined in claim 15, wherein the detection light proceeding from the specimen is fluorescent light.

20. The method as defined in claim 15, wherein the light of the light source has several wavelengths.

21. The method as defined in claim 20, comprising the further step of
   blocking or attenuating a portion having at least one selectable wavelength out of the light for illumination using the optical arrangement.

22. The method as defined in claim 20, comprising the further steps of
   guiding the light for illumination over the specimen line-by-line using a beam deflection device and
   switching over the wavelength of the light for illumination, the switchover being accomplished line-by-line.

23. The method as defined in claim 20, wherein the method is carried out with a microscope, a scanning microscope, a confocal scanning microscope, or a flow cytometer.

24. The method as defined in claim 20, wherein the specimen is a biochip or a biological specimen.

25. The method as defined in claim 24, wherein the specimen is marked with a fluorescent protein, whereby the detection light proceeding from the specimen changes the wavelength with time.

* * * * *

UNITED STATES PATENT AND TRADEMARK OFFICE
CERTIFICATE OF CORRECTION

PATENT NO. : 6,867,899 B2
APPLICATION NO. : 10/316544
DATED : March 15, 2005
INVENTOR(S) : Werner Knebel Page 1 of 1

It is certified that error appears in the above-identified patent and that said Letters Patent is hereby corrected as shown below:

In claim 7 of the patent, at column 8, line 59 should read --the optical arrangement <u>and that directs</u> it to the spectrometer-- instead of "the optical arrangement it to the spectrometer".

Signed and Sealed this

Fourteenth Day of August, 2007

JON W. DUDAS
*Director of the United States Patent and Trademark Office*